Aug. 7, 1945. S. SCHNELL 2,381,004
RATIO CHANGING FLUID PRESSURE SYSTEM
Filed Dec. 11, 1942 2 Sheets-Sheet 2
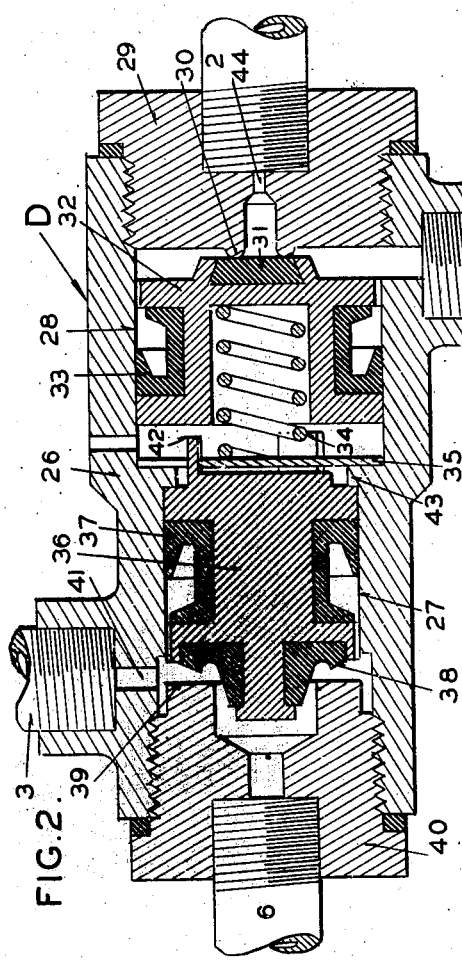
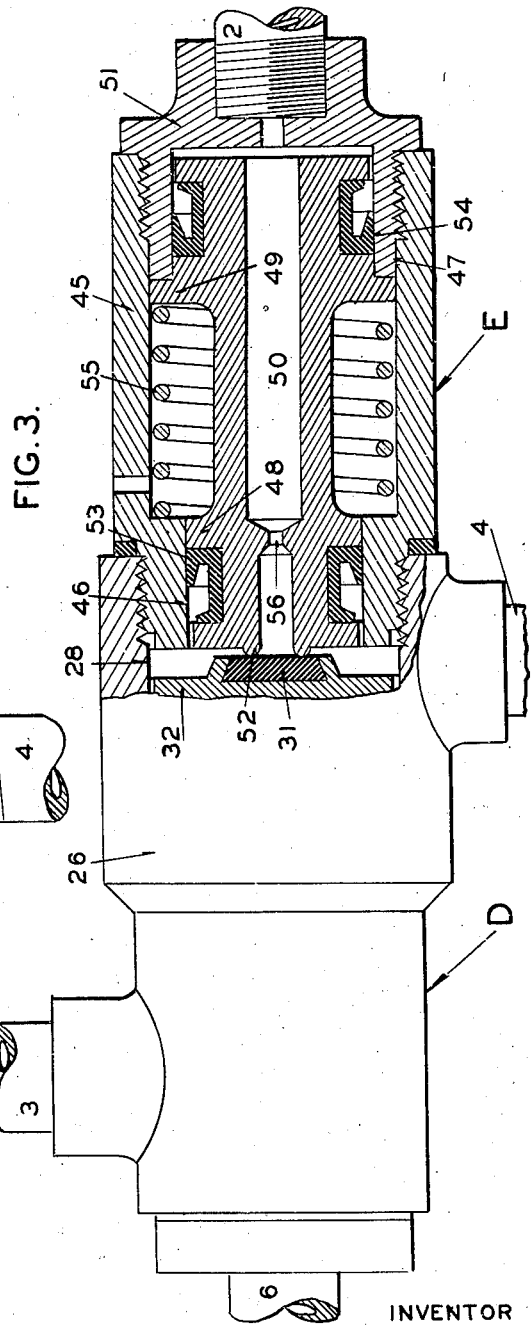
INVENTOR
S. SCHNELL
BY
ATTORNEY Patented Aug. 7, 1945

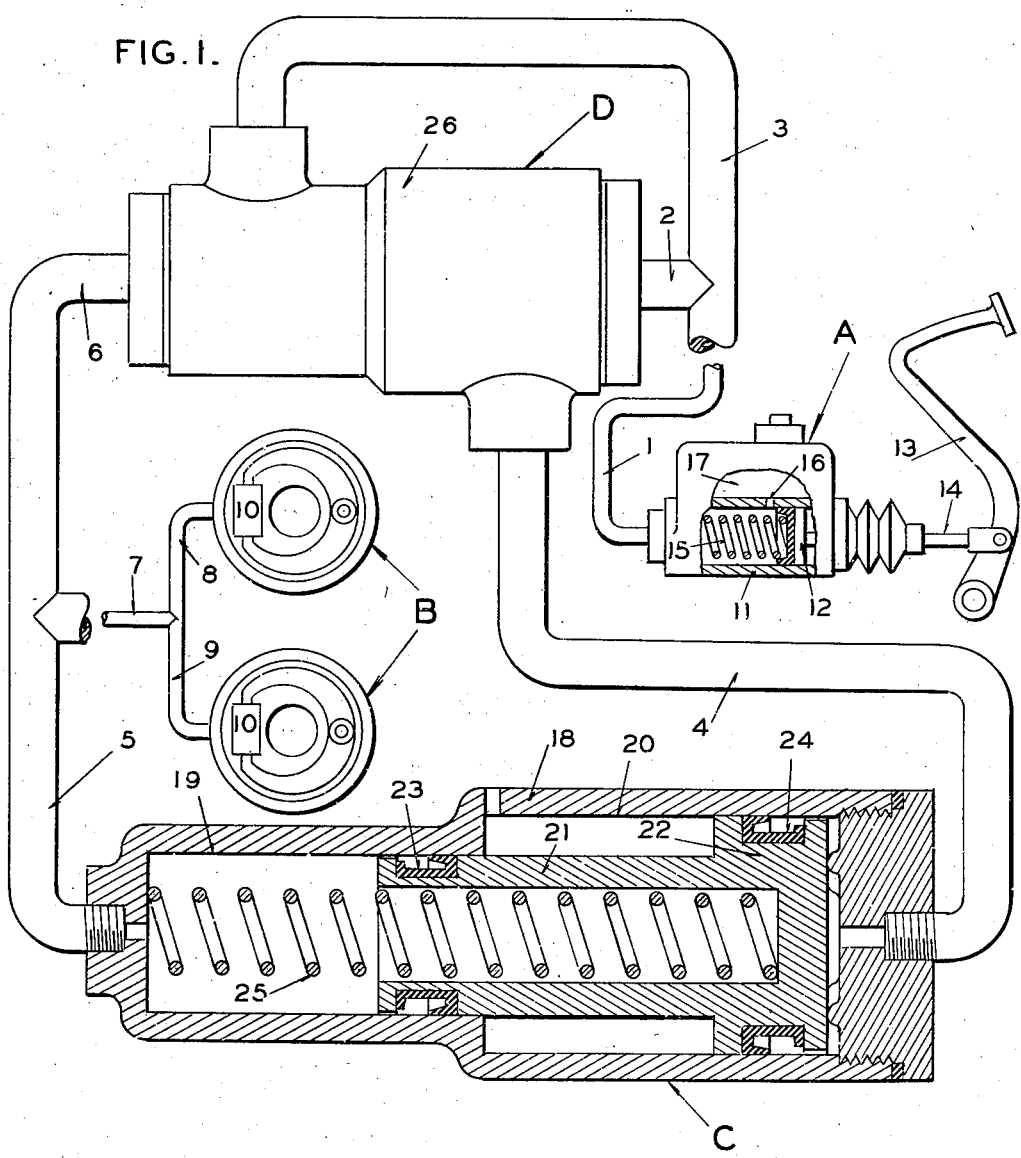

2,381,004

UNITED STATES PATENT OFFICE 2,381,004

RATIO CHANGING FLUID PRESSURE SYSTEM

Steve Schnell, Kirkwood, Mo., assignor to Wagner Electric Corporation, St. Louis, Mo., a corporation of Delaware Application December 11, 1942, Serial No. 468,660

10 Claims. (Cl. 60—54.5)

My invention relates to fluid pressure actuating systems and more particularly to such a system having embodied therein means for changing the ratio between fluid pressure from a source and that employed in performing the actuating function.

One of the objects of my invention is to embody in a fluid pressure actuating system, means comprising improved valve means for permitting a change in ratio between the input and the output fluid pressure when a predetermined fluid pressure has been developed.

Another object of my invention is to associate with said valve means an improved means for preventing an increase in the output pressure when the developed pressure reaches a predetermined pressure greater than that at which the change in ratio takes place.

Still another object of my invention is to so construct the ratio changing valve means and pressure increase preventing means that they are separate units, thus permitting the valve means unit or both units to be readily embodied in an existing fluid pressure actuating system having only a pressure developing means, such as a master cylinder device, and an actuating fluid motor or motors.

Other objects of my invention will become apparent from the following description taken in connection with the accompanying drawings in which Figure 1 is a schematic view of a fluid pressure system having a ratio changing means embodying my invention, parts being shown in section; Figure 2 is an enlarged sectional view of the change-over valve means; and Figure 3 is a sectional view showing the means for limiting the fluid pressure which can become effective in the actuating fluid motor and the manner in which it is associated with the change-over valve means.

Referring first to Figures 1 and 2, my improved ratio changing fluid pressure actuating system is shown as being employed to operate brakes but such is by way of example only as it can be employed to operate any desired device. As shown by the schematic view of Figure 1, there is provided a master cylinder device A for developing hydraulic pressure to operate the brake assembly B and interposed in the conduits between these two devices is a compounding piston and cylinder combination C and a change-over valve mechanism D. The outlet of the master cylinder device is connected to a conduit 1 which has branch conduits 2 and 3 connected to the valve mechanism D. A conduit 4 connects the valve mechanism to one end of the compounding piston and cylinder combination C. This combination and the valve mechanism D are connected by conduits 5 and 6, respectively, to a common conduit 7 and branch conduits 8 and 9 leading to the fluid motors 10 for actuating the brake assembly B.

The master cylinder device is of known construction and comprises a cylinder 11 in which is reciprocable a piston 12 capable of being actuated by a pedal 13 through a piston rod 14. The piston is normally biased to retracted position by a spring 15 and when in this position it uncovers a porthole 16 for placing the cylinder and system in communication with reservoir 17.

The compounding piston and cylinder combination C consists of a casing 18 provided with a small cylinder 19 and a large cylinder 20. The small cylinder has a piston 21 reciprocable therein and integral with this piston is a piston 22 for reciprocation in the large cylinder. The pistons are provided with packing cups 23 and 24. The large cylinder 20 is connected to the previously referred to conduit 4 coming from the valve mechanism D and the small cylinder is connected to the previously referred to conduit 5 leading to the fluid motors of the brake assembly. A light spring 25 normally biases the pistons toward the right hand ends of the two cylinders. It is seen from this construction that if fluid under pressure enters cylinder 20 through conduit 4 and acts on piston 22, the force created thereby will cause the pistons to move to the left whereby piston 21 will place the fluid in cylinder 19 under a greater pressure than that of the fluid acting on piston 22 due to the different areas of the pistons. The ratio between the areas of pistons 21 and 22 will determine the ratio between the fluid pressure acting on piston 22 and that developed by piston 21.

Referring now to Figure 2, the details of the changeover valve mechanism D will be described. Said valve mechanism comprises a casing 26 provided with a small cylinder 27 and a larger cylinder 28. The outer end of the larger cylinder is connected to branch conduit 2 leading from the master cylinder device and to conduit 4 and the outer end of the small cylinder is connected to conduit 6 leading to the fluid motors of the brake assembly. The plug 29, which closes the outer end of cylinder 28 and acts as a connecting element between said cylinder and conduit 2, is provided with a valve seat 30 which cooperates with a valve element 31 carried by a piston 32 positioned in the large cylinder 28. A packing element 33 seals this piston and a spring 34 of predetermined strength acts on the rear of the piston to normally bias the valve element 31 to seated position to thus prevent fluid from the master cylinder device entering the cylinder 28. The spring is interposed between piston 32 and plate 35 at the end of cylinder 28.

Within the smaller cylinder 27 is a piston 36 having a packing 37 and carrying on its forward end a valve element 38 for cooperation with a seat 39 carried by plug 40 employed for connecting the cylinder with conduit 6. The previously referred to branch conduit 3 coming from the master cylinder device is connected to communicate with cylinder 27 forwardly of the piston 36, such connection being by means of an opening 41. The rear end of piston 36 is provided with projections 42 which extend through plate 35 to a point closely adjacent the rear end of the larger piston 32. Stop means 43 is also provided for piston 36 to prevent the piston from assuming a position where projections 42 will engage piston 32 when valve element 31 is seated.

Before referring to the operation of the system it will be assumed that the ratio of the areas of pistons 21 and 22 is to be one to two, although any other ratio can be employed. The spring 34 acting on piston 32 to hold valve element 31 seated will be assumed to be of such strength that it will maintain the valve closed only when the pressure developed by the master cylinder device is less than one hundred pounds per square inch. The area of piston 32 is selected so that when fluid pressure is acting thereon, a sufficient force will be created to hold valve element 38 seated against the force exerted by spring 34 plus the force created by the fluid pressure in conduit 6 and acting on the area of valve element 38 (twice the pressure of fluid acting on piston 32) plus the pressure acting on the area of piston 36 (same as the fluid pressure acting on piston 32). In other words, the area of piston 32 must be such that when the piston is moved to the left and fluid pressure from the master cylinder acts thereon, it will maintain valve element 38 seated against any force which will act to move piston 32 to the right and permit unseating of the valve element.

The parts of the different units of the system will be in the position shown when the system is not being operated. If it should be desired to apply the brakes, the master cylinder device is operated by compressing pedal 13. This will cause porthole 16 to be cut off and fluid pressure developed and transmitted through conduits 1, 2 and 3. Since valve element 31 is closed, there will be no flow of fluid through conduit 2 to conduit 4. Valve element 38, however, is open and fluid under pressure is transmitted to the fluid motors of the brakes by way of conduits 6, 7, 8 and 9. Since valve element 31 will not open except when the fluid pressure developed by the master cylinder is greater than one hundred pounds per square inch, the brakes can be directly applied by the master cylinder up to this developed pressure. If this pressure is not reached when the master cylinder device is released, the fluid in the brake fluid motors will return through the same conduits and the open valve element 38.

If the pressure developed by the master cylinder device exceeds one hundred pounds per square inch, the valve element 31 will be unseated. This will permit fluid under pressure to enter cylinder 28 at the right end of piston 32 and due to the large area of the piston now exposed to the master cylinder developed pressure, said piston 32 will be moved to the left, compressing spring 34 and moving piston 36 in order to close valve element 38. With valve element 31 open, fluid under pressure from the master cylinder device will be capable of becoming effective on the right hand end of piston 22 in the compounding piston and cylinder combination C. As the pressure of the master cylinder device increases, pistons 22 and 21 will be moved to the left as a unit, thereby compressing spring 25 (which is only of such strength as to return the pistons to their right hand end of the cylinder) and causing piston 21 to develop fluid pressure which will have twice the value of that acting on piston 22. This double pressure will be effective to operate the brake fluid motors. As the pressure developed by the master cylinder device continues to increase, it is seen that the fluid pressure in the brake fluid motors will also increase by the ratio of two to one.

If it is desired to release the brakes, the brake pedal is released and piston 12 allowed to return to its retracted position. As piston 12 retracts there will be a fall in the fluid pressure in cylinder 28, thus permitting valve element 38 to be opened by the pressure acting thereon. As soon as the valve element 38 opens, the fluid in the fluid motors can flow directly back into the master cylinder. Also, as the master cylinder developed pressure is released, pistons 21 and 22 will be forced to the right by the fluid pressure acting on piston 21 and also by the force of spring 25. This will push the fluid at the right of piston 22 back to the master cylinder device. The valve element 31 will not completely close until pistons 21 and 22 reach their right hand positions as the returning fluid under pressure will act on the large area of piston 32 to such an extent as to keep the valve open. All the parts will again assume their positions as shown in Figures 1 and 2.

In order to prevent any rapid operation of the master cylinder piston from developing momentarily high fluid pressures which will cause premature opening of valve element 31, a restriction 44 is provided in plug 29. This restriction also prevents a sudden change-over from the low pressure to the high pressure.

In Figure 3 the change-over valve mechanism D is shown as having associated therewith a pressure limiting means E whereby the pressure which can become effective in the fluid motors of the brake assembly cannot exceed a predetermined value. As shown, this means comprises a casing 45 screwed into the end of cylinder 28 of the change-over valve mechanism D in place of plug 29. This casing is provided with cylinders 46 and 47 (cylinder 46 being somewhat smaller than cylinder 47) in which are integrally connected pistons 48 and 49. A passage 50 extends through the pistons. The outer end of casing 45 is closed by a plug 51 to which is connected conduit 2 coming from the master cylinder device. The piston 48 is provided with a valve seat 52 surrounding conduit 50 and this valve seat is adapted to cooperate with valve element 31 of the change-over valve mechanism D. Packing cups 53 and 54 are associated with pistons 48 and 49 for preventing fluid from passing said pistons in the direction of the central part of casing 45. A spring 55 of predetermined strength is interposed between the piston 49 and casing 45 to hold pistons 48 and 49 at the right end of the casing where piston 49 abuts plug 51.

The change-over valve mechanism D functions in the same manner as previously described as valve element 31 will be unseated when the predetermined pressure of one hundred pounds per square inch is developed by the master cylinder device, thus causing closing of valve element 38 and operation of the compounding piston and cylinder combination C. When the pressure being developed by the master cylinder device reaches such a predetermined value greater than that at which valve element 31 opened, pistons 48 and 49 will be moved to the left against the bias of spring 55, thereby causing seat 52 on piston 48 to engage valve element 31 and preventing any more fluid under pressure from acting on piston 22 in the compounding piston and cylinder combination C. Thus pistons 21 and 22 will no longer be moved and no more pressure can be built up in the fluid motors of the brakes. The relationship between the areas of pistons 48 and 49 and the strength of spring 55 will determine when valve element 31 will become reseated.

When the pressure developed by the master cylinder device is released, pistons 48 and 49 will return to their positions at the right end of their cylinders under the action of spring 55, thus again opening valve element 31. The release of the brakes will then take place in the manner already described.

In order that quick operation of the master cylinder piston will not cause premature unseating of valve element 31, passage 50 is provided with a restriction 56. Said restriction also prevents a sudden change-over from the low pressure to the high pressure.

Being aware of the possibility of modifications in the particular structure herein described without departing from the fundamental principles of my invention, I do not intend that its scope be limited except as set forth by the appended claims.

Having fully described by invention, what I claim as new and desire to secure by Letters Patent of the United States is:

1. In a fluid pressure system, a source of fluid pressure, a fluid motor, conduit means between the source and the fluid motor, a ratio changing device comprising connected movable members of different areas, means for causing the movable member of smaller area to act on a body of fluid in communication with the motor, means including valve means having a movable valve element for permitting fluid pressure from the source to act on the member of larger area, means for maintaining said valve element of the valve means closed when the fluid pressure from the source is below a predetermined valve, and means for closing the conduit means when said valve means is open, said last named means including means engageable with said first mentioned valve element to urge said last mentioned valve into engagement with its seat to close said conduit means.

2. In a fluid pressure actuating system, a source of fluid pressure, an actuating fluid motor, conduit means between the source and the motor, fluid pressure ratio changing means comprising pistons of different diameters, conduit means for permitting the larger piston to be subject to fluid pressure from the source, to move both pistons from normally retracted positions, conduit means for permitting the smaller piston to develop fluid pressure in the motor, when the larger piston is moved, valve means associated with the second named conduit means for preventing the larger piston from being subject to fluid under pressure from the source except when said fluid under pressure is above a predetermined value, other valve means controlled by fluid pressure from the source above the predetermined value for maintaining the first named conduit means closed, and means for permitting re-opening of said other valve means upon release of fluid pressure from the source and prior to the return of the pistons to their retracted positions.

3. In a fluid pressure actuating system, a source of fluid pressure, an actuating fluid motor, conduit means between the source and the motor, fluid pressure ratio changing means comprising pistons of different diameters, conduit means for permitting the larger piston to be subject to fluid pressure from the source, conduit means for permitting the smaller piston to develop fluid pressure in the motor, valve means associated with the second named conduit means for permitting the larger piston to be subject to fluid under pressure from the source but only when said fluid under pressure is above a predetermined value, other valve means for the first named conduit means, and means comprising a third piston for closing said other valve means, said piston being subject to fluid pressure from the source only when said fluid pressure acts on the larger piston.

4. In a fluid pressure system, a source of fluid pressure, a fluid motor, conduit means between the source and the motor, a ratio changing device comprising connected pistons of different areas, means for causing the smaller piston to act on a body of fluid in communication with the motor, conduit means for permitting the larger piston to be subject to fluid pressure from the source, normally open valve means for the first conduit means, valve means for closing the second conduit means and comprising a valve element biased to closed position by a predetermined force, a third piston associated with the valve element and subject to fluid pressure from the source only when the valve element is open, and means for closing the first named valve means by movement of the third piston when the valve element is opened by a predetermined fluid pressure from the source.

5. In a fluid pressure system, a source of fluid pressure, a fluid motor, conduit means between the source and the motor, a ratio changing device comprising connected pistons of different areas, means for causing the smaller piston to act on a body of fluid in communication with the motor, conduit means for permitting the larger piston to be subject to fluid pressure from the source, normally open valve means for the first conduit means, valve means for closing the second conduit means and comprising a valve element biased to closed position by a predetermined force, a third piston associated with the valve element and subject to fluid pressure from the source only when the valve element is open, means for closing the first named valve means by movement of the piston when the valve element is opened by the predetermined fluid pressure from the source, and means for re-opening the first named valve means by fluid pressure effective in the fluid motor when the fluid pressure from the source which is effective on the last named piston is released.

6. In a fluid pressure system, a source of fluid pressure, a fluid motor, conduit means between the source and the fluid motor, a ratio changing device comprising connected movable members of different areas, means for causing the movable member of smaller area to act on a body of fluid in communication with the motor, means for substantially simultaneously causing fluid pressure from the source to act on the movable member of larger area and preventing the source from communicating with the motor through the conduit means, said last named means being automatically operable only when the pressure from the source is above a predetermined value, and means for preventing increasing fluid pressure from the source to continue to act on the member of larger area after the pressure from the source reaches a predetermined value greater than the first named predetermined value, said last named means comprising means for cutting off communication between the source and the member of larger area.

7. In a fluid pressure system, a source of fluid pressure, a fluid motor, conduit means between the source and the fluid motor, a ratio changing device comprising connected movable members of different areas, means for causing the movable member of smaller area to act on a body of fluid in communication with the motor, means for substantially simultaneously causing fluid pressure from the source to act on the movable member of larger area and preventing the source from communicating with the motor through the conduit means, said last named means being automatically operable only when the pressure from the source reaches a predetermined value and comprising valve means for permitting fluid pressure from the source to act on the member of larger area, means for maintaining said valve means closed when the fluid pressure from the source is below the predetermined value and means for closing the conduit means when the valve means is opened, and means for causing re-closing of the valve means when the pressure from the source reaches a predetermined value greater than the predetermined value at which it is opened.

8. In a fluid pressure actuating system, a source of fluid pressure, an actuating fluid motor, conduit means between the source and the motor, fluid pressure ratio changing means comprising pistons of different diameters, conduit means for permitting the larger piston to be subject to fluid pressure from the source, conduit means for permitting the smaller piston to develop fluid pressure in the motor, valve means associated with the second named conduit means for permitting the larger piston to be subject to fluid pressure from the source only when said fluid pressure is above a predetermined value, other valve means for the first named conduit means, means comprising a piston for closing said other valve means, said piston being subject to fluid pressure from the source only when said fluid pressure acts on the larger piston, and means comprising a member subject to the fluid pressure from the source and movable to cause closing of said valve means of the second conduit means only when the pressure from the source reaches a predetermined value greater than the first named predetermined value.

9. In a fluid pressure system, a source of fluid pressure, a fluid motor, conduit means between the source and the motor, a ratio changing device comprising connected pistons of different areas, means for causing the smaller piston to act on a body of fluid in communication with the motor, conduit means for permitting the larger piston to be subject to fluid pressure from the source, normally open valve means for the first conduit means, valve means for closing the second conduit means and comprising a valve seat and a valve element biased on said seat by a predetermined force, a piston carrying the valve element and subject to fluid pressure from the source only when the valve element is unseated, means for closing the first named valve means by movement of the piston when the valve element is opened by a predetermined fluid pressure from the source, and means for moving the valve seat to re-close the second conduit means when the fluid pressure from the source reaches a predetermined value greater than that at which the valve element was unseated.

10. In a fluid pressure system, a source of fluid pressure, a fluid motor, conduit means between the source and the fluid motor, a ratio changing device comprising connected simultaneously movable members of different areas, means for causing the movable member of smaller area to act on a body of fluid in communication with the motor, other conduit means for permitting fluid pressure from the source to act on the member of larger area, valve means for the last named conduit means including a movable element, means for maintaining the movable element closed until the fluid pressure from the source is above a predetermined value, valve means for the first named conduit means, and means for closing the last named valve means and maintaining it closed when said valve element of the first valve means is opened, said last named means comprising means simultaneously movable with the valve element in its opening direction for acting to operate the last named valve means and being subject to fluid pressure from the source only after the valve element is opened.

STEVE SCHNELL.